(12) United States Patent
Andrews

(10) Patent No.: US 7,029,587 B2
(45) Date of Patent: Apr. 18, 2006

(54) WATER PURIFICATION

(75) Inventor: Craig C. Andrews, College Station, TX (US)

(73) Assignee: Lynntech, Inc., College Station, TX (US)

( * ) Notice: Subject to any disclaimer, the term of this patent is extended or adjusted under 35 U.S.C. 154(b) by 145 days.

(21) Appl. No.: 10/816,805

(22) Filed: Apr. 2, 2004

(65) Prior Publication Data

US 2005/0218083 A1 Oct. 6, 2005

(51) Int. Cl.
- C02F 1/00 (2006.01)
- C02F 1/32 (2006.01)
- C02F 1/78 (2006.01)

(52) U.S. Cl. .................. 210/739; 210/748; 210/760; 210/764; 210/143; 210/167; 210/199; 210/200; 62/67; 62/78

(58) Field of Classification Search ............... 210/748, 210/760, 764, 739, 744, 805, 143, 167, 192, 210/199, 200, 294; 62/66, 67, 78, 344
See application file for complete search history.

(56) References Cited

U.S. PATENT DOCUMENTS

| | | | |
|---|---|---|---|
| 4,141,830 A | 2/1979 | Last | |
| 4,752,401 A | 6/1988 | Bodenstein | |
| 4,827,727 A * | 5/1989 | Caracciolo | ..................... 62/63 |
| 5,494,576 A | 2/1996 | Hoppe et al. | |
| 5,547,590 A | 8/1996 | Szabo | |
| 6,093,312 A | 7/2000 | Boulter et al. | |
| 6,153,105 A | 11/2000 | Tadlock et al. | |
| 6,182,453 B1 | 2/2001 | Forsberg | |
| 6,232,010 B1 | 5/2001 | Cisar et al. | |
| 6,334,328 B1 | 1/2002 | Brill | |
| 6,506,428 B1 * | 1/2003 | Berge et al. | .................. 426/66 |
| 2003/0080068 A1 | 5/2003 | Koslow et al. | |
| 2003/0080467 A1 | 5/2003 | Andrews et al. | |

OTHER PUBLICATIONS

International Search Report for PCT/US2005/009109.

* cited by examiner

Primary Examiner—Robert A. Hopkins
(74) Attorney, Agent, or Firm—Streets & Steele; Frank J. Campigotto; Jeffrey L. Streets

(57) ABSTRACT

An apparatus for decontaminating water in an ice machine or a beverage-dispensing machine comprising an ultraviolet radiation source, an ozone source and a controller. As potable water enters the apparatus via a conduit, the potable water is decontaminated by an ultraviolet (UV) light source, which irradiates the potable water, and by an ozone generation system that provides ozone to be injected into the potable water to oxidize contaminants. Because water is often circulated within ice machines, the circulating water conduits and reservoir are also treated with ozone and UV radiation. The present invention also provides a controller for optimizing the decontamination process by providing UV light and ozone production only when required for decontamination. Typically, ozone generation and UV radiation are required whenever makeup potable water is brought into the apparatus or when the refrigeration compressor is running.

35 Claims, 5 Drawing Sheets

WATER PURIFICATION

BACKGROUND OF THE INVENTION

1. Field of the Invention

The present invention relates to water treatment, and more specifically, to a method and apparatus for purifying potable water for use in ice machines and beverage machines.

2. Description of Related Art

Commercial ice-making machines and beverage dispensing machines are susceptible to contamination by microorganisms such as bacteria, yeast, fungi, and mold. Once this equipment has become contaminated, these microorganisms may multiply and establish flourishing colonies that can form scale buildup in the lines, tubing, evaporator surfaces, drains and other parts of the machines. Furthermore, these microorganisms may present a serious health hazard to people ingesting the contaminated products dispensed from the ice or beverage machines.

The need to keep ice making and beverage dispensing equipment clean over time is well known. Therefore, in an ice-making machine for example, the ice-forming evaporator, fluid lines and ice storage areas of the ice machine must be periodically cleaned. While manual cleaning with detergents and sterilizing chemicals may be effective, cleaning schedules are not, as a practical matter, always adhered to nor may the job always be satisfactorily completed in terms of a thorough cleaning and rinsing of all the contacted surfaces. Thus, systems have been developed that include electronic controls to automatically execute a sanitizing cycle at set periods wherein cleaning agents are pumped through the system and then rinsed out. Of course, the automatic systems can fail as well, where, for example, the cleaning agent reservoir runs out of cleaner, or the apparatus simply breaks down or fails to operate properly.

The use of ozone ($O_3$) as a sanitizing/oxidizing agent is well known, and especially well known is the use of $O_3$ to kill microorganisms in water. In U.S. Pat. No. 6,153,105, Tadlock et al. placed a venturi in the circulating water line of an ice machine to use the circulating water as a motive fluid to entrain ozone from a corona discharge process into the circulating water. The corona discharge process generates ozone at a pressure below the potable water supply pressure to the ice machine, thereby requiring the use of a venturi. Thus, the circulating water, with the venturi, carries $O_3$ over the ice making evaporator providing some bactericidal or bacteriostatic effect.

Ozone may also be produced by electrolysis, which advantageously can produce ozone at pressures greater than that of the circulating water line within the ice machine. Therefore, the ice machine would not require a venturi or other apparatus to inject the ozone into the water line. Electrolytic production of ozone occurs in an electrochemical cell by causing oxidation and reduction reactions that liberate or consume electrons. These reactions take place at electrode/solution interfaces, where the electrodes must be good electronic conductors. In operation, a cell is connected to an external load or to an external voltage source, and electrons transfer electric charge between the anode and the cathode through the external circuit. To complete the electric circuit through the cell, an additional mechanism must exist for internal charge transfer. One or more electrolytes provide internal charge transfer by ionic conduction. These same electrolytes must be poor electronic conductors to prevent internal short-circuiting of the cell.

Proton exchange membranes (PEM's) are one category of electrolytes that are particularly suitable for use in conjunction with the production of ozone in electrochemical cells. PEM's typically have a polymer matrix with functional groups attached that are capable of exchanging cations or anions. The polymer matrix generally consists of an organic polymer such as polystyrene, or other polytetrafluoroethylene (PTFE) analog. In general, the PEM material is an acid with a sulfonic acid group incorporated into the matrix.

Electrocatalysts are placed in intimate contact with the proton exchange membranes. Typical electrocatalysts for an ozone generator may be lead dioxide on the anode or ozone producing side of the cell and platinum black on the cathode side of the electrochemical cell. In many such cells, hydrogen gas is generated at the cathode as a byproduct of the electrolysis reaction that produces ozone at the anode.

Ultraviolet radiation can also kill microorganisms in water and other liquids. Conventionally, the ultraviolet light source is a mercury-vapor type lamp, producing the majority of the radiated energy at a wavelength of about 254 nanometers, a wavelength know to be effective in killing microorganisms in water. The lamp may be immersed in the water or liquid or the lamp may be placed adjacent to a liquid stream flowing in a transparent conduit or in a conduit having a transparent window through which the ultraviolet radiation may pass. In U.S. Pat. No. 6,153,105, Tadlock et al. uses ultraviolet radiation to treat the circulating water in an ice machine.

FIG. 1 is a schematic view of a conventional water circulation type icemaker. The icemaker is connected to a potable water supply 13 to provide makeup water to the reservoir 10. When the water level 16 in the reservoir 10 drops below a certain level, the level controller 11 sends a signal to the refill valve 12 to open and allow makeup water into the reservoir through a supply conduit 14. A circulation pump 15 circulates water through a circulation conduit 17 from the reservoir 10 to the ice tray/evaporator plates 18. The ice tray/evaporator plates 18 produce ice while excess water 19 overflows back into the reservoir 10.

While Tadlock et al. and others have made strides in treating water in ice machines and beverage machines, there are still problems that need to be solved. Because the water circulates throughout the system in the icemaker, microorganisms have the opportunity to grow and flourish because the water circulation gives the microorganisms the residence time required for them to multiply and establish colonies. Furthermore, additional microorganisms are introduced into the system whenever the makeup water fills the reservoir by batch. Accordingly, water treatment must occur when the batch is brought into the reservoir at a fairly high rate, making adequate treatment more difficult. Ozone treatment is made more difficult because the source of the ozone must be capable of varying the ozone production rate in proportion to the water refill rate up to an amount adequate to treat a large influx of water when the batch fill of the reservoir takes place.

What is needed is an apparatus that can treat ice making and beverage dispensing machines to keep them free of microorganism contamination. It would be an advantage if such an apparatus could provide disinfecting quantities of biocide on demand in response to a batch filling of the reservoir. It would be further advantageous if the apparatus could provide and distribute the biocide sufficiently to preclude microorganism growth throughout the system, including both the areas used to produce the ice or beverage and the areas used to dispense the ice or beverage.

SUMMARY OF THE INVENTION

The present invention provides an ice machine and a method for decontaminating water. An ice machine of the present invention comprises a makeup water conduit comprising one or more ultraviolet transmission surfaces and one or more ozone injection ports and a circulating water conduit comprising one or more ultraviolet transmission surfaces and one or more ozone injection ports. Typically the water is circulated by a circulating pump from a water reservoir to evaporator plates. The ice machine further comprises one or more ultraviolet radiation sources that are adjacent to the ultraviolet transmission surfaces and an ozone generator in fluid communication with the one or more ozone injection ports. The ultraviolet radiation sources may be an ultraviolet lamp that produces a majority of its ultraviolet radiation at about 254 nanometers. Also, the ice machine comprises one or more controllers, wherein the controllers start and stop the one or more ultraviolet radiation sources, the ozone generator, or combinations thereof.

Typically the ozone injection ports are located either upstream or downstream of each of the one or more ultraviolet radiation sources or combinations thereof. The ozone injection ports may be located less than one conduit diameter downstream of the one or more ultraviolet radiation sources or alternatively, less than three conduit diameters downstream of the one or more ultraviolet radiation sources.

The water level in the water reservoir may be maintained with a refill valve. The refill valve that is located in the makeup water conduit controls the water level by opening the refill valve to refill the water reservoir whenever a water level in the water reservoir reaches a low level setpoint. The level may also be controlled to maintain a constant water flow by modulating the water flow into the water reservoir. One of the one or more ozone injection points is typically located no more than three conduit diameter downstream of the refill valve or alternatively, no more than one conduit diameter downstream of the refill valve. One of the one or more ozone injection points is typically located no more than three conduit diameter downstream of the circulating pump discharge or alternatively, no more than one conduit diameter downstream of the circulating pump discharge.

The ozone generator typically comprises an electrolyzer. The ozone leaves the ozone generator as a gas, as ozonated water or as combinations thereof. When the ozone generator produces gaseous ozone, the generator may further comprise at least one hydroscopic membrane, wherein the gaseous ozone may pass through the membrane and water cannot pass through the membrane.

The electrolyzer may comprise a cathode electrode, an anode electrode, and an electrolyte disposed between the cathode and the anode, wherein the electrolyte is a proton exchange membrane. Optionally, the electrolyzer may comprise means for retracting the anode electrode or the cathode electrode away from the proton exchange membrane to stop ozone production. The means for retracting the electrode may be a bourdon tube, a set of bellows, or a hydraulic piston. The motive fluid to move the means for retracting may be selected from a refrigerant from a refrigerant compressor discharge line or pressurized water from the circulating pump discharge or a potable water supply. Alternatively, the electrode may be retracted by an electric motor.

The ozone generator may be in fluid communication with each of the ozone injection ports. The one or more controllers for starting and stopping ozone generation communicate electrical signals, mechanical signals, or combinations thereof with devices such as a refrigeration compressor, a condenser fan, and/or the circulating pump.

An embodiment of a method for decontamination water in an ice machine comprises exposing water in a region of a makeup water conduit to ultraviolet radiation exposing water in a region of a circulating water conduit to ultraviolet radiation through the one ore more ultraviolet transmission surfaces; injecting ozone into the water adjacent the downstream ends of the ultraviolet radiation exposing region; and controlling ozone production with a controller, wherein an ozone generator is not continuously producing ozone. The method may further comprise injection ozone into the water reservoir.

Typically, the ozone injection ports are less than 10 conduit diameters downstream of the ultraviolet transmission surfaces or, alternatively, no more than 1 conduit diameter downstream of the ultraviolet transmission surfaces. The ultraviolet radiation may be generated by an ultraviolet lamp.

The method further comprises injection ozone into the ozone injection port downstream of the makeup valve that is used to control the flow of makeup water to the water reservoir. Typically, the ozone injection port downstream of the makeup valve is less than 10 conduit diameters downstream of the makeup water valve or, alternatively, valve is less than 1 conduit diameter downstream of the makeup water valve.

The method further comprises producing ozone for injection into the ozone injection ports. In one embodiment, the ozone generator is an electrolyzer. The ozone leaving the electrolyzer is in a form of gaseous ozone or ozonated water. The method of one embodiment further comprises separating gaseous ozone from the ozonated water in an anode of the electrolyzer. The step of separating gaseous ozone may be accomplished with at least one hydrophobic membrane.

In one embodiment of the present invention, the step of controlling ozone production with a controller further includes pulling an anode electrode from a proton exchange membrane to stop ozone production and pushing the anode electrode against the proton exchange membrane to start ozone production.

The step of controlling ozone production may further comprise receiving a communication signal from the controller to push an anode electrode against a proton exchange membrane, wherein the communication from the controller may be an electrical signal, a mechanical signal or combinations thereof. The controller may be an electrical device, a mechanical device, or combinations thereof. The controller may be a bourdon tube, a set of bellows, or a hydraulic piston. The motive fluid to move the controller may be a refrigerant from a compressor discharge line or pressurized water from the circulating pump discharge or a potable water supply. The ozone generator is typically in fluid communication with each of the one or more ozone injection ports.

DETAILED DESCRIPTION OF PREFERRED EMBODIMENTS

Figure 1:
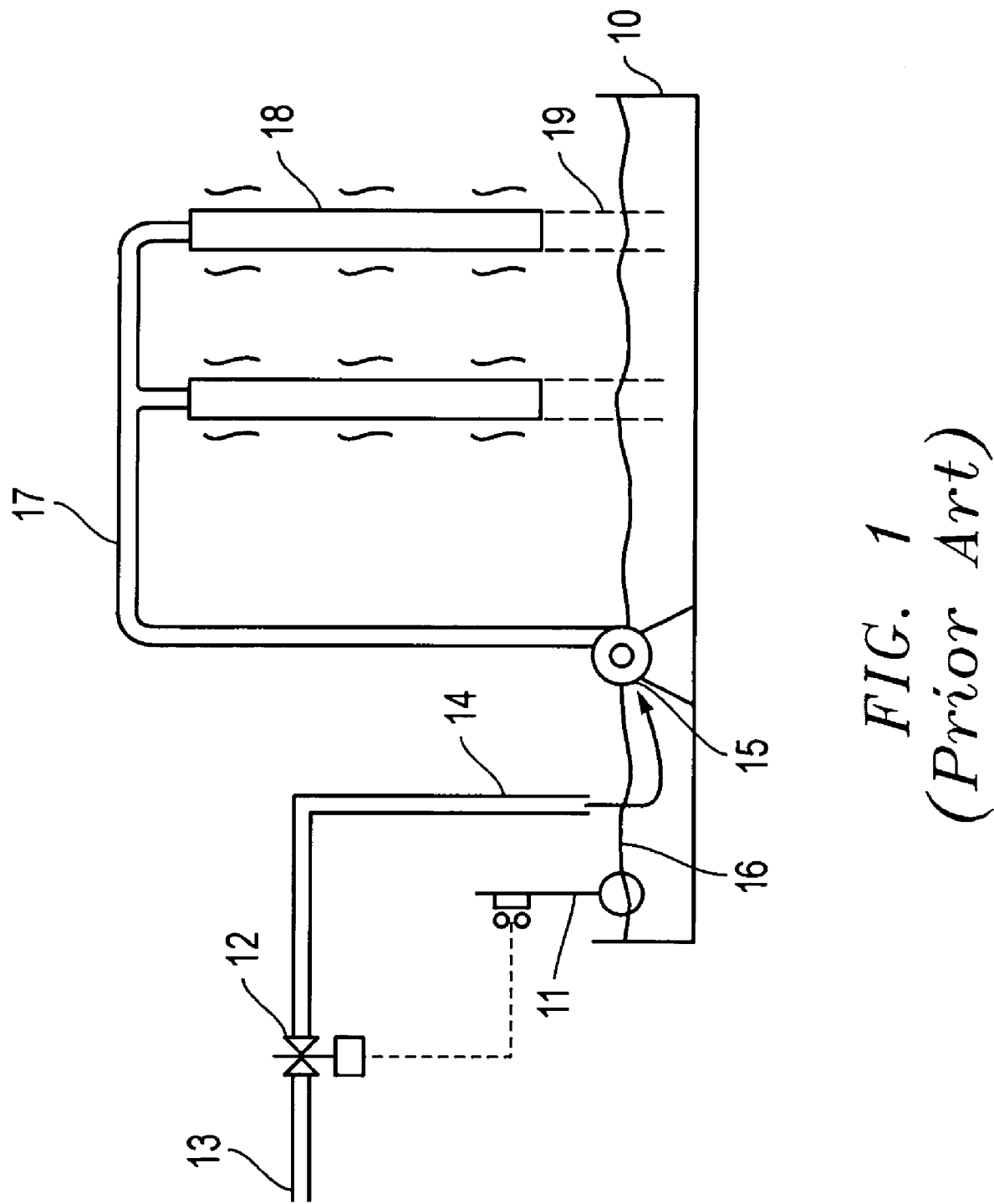
FIG. 1 is a schematic view of a conventional water circulation type icemaker.

The present invention provides an apparatus for decontaminating water in an ice machine or a beverage-dispensing machine comprising an ultraviolet radiation source, an ozone source and a controller. As potable water enters the apparatus via a conduit, the potable water is decontaminated by an ultraviolet (UV) light source, which irradiates the potable water, and by an ozone generation system that provides ozone to be injected into the potable water to oxidize contaminants. Because water is often circulated within ice machines, the circulating water conduits and reservoir are also treated with ozone and UV radiation. The present invention also provides a controller for optimizing the decontamination process by providing UV light and ozone production only when required for decontamination. Typically, ozone generation and UV radiation are required whenever makeup potable water is brought into the apparatus or when the refrigeration compressor is running.

The apparatus comprises one or more conduits adaptable for supporting the decontamination of the potable water by UV. For example, a preferred embodiment provides a UV lamp mounted external to a conduit, wherein at least one portion of the conduit provides a substantially UV transparent wall through which the UV radiation from the UV lamp may pass. Alternatively, a UV source internally mounted within a conduit may be used with the advantage that it does not require any portion of the conduit to be transparent to the UV radiation. Because the conduit must support the decontamination of potable water by UV, any portion of the conduit that is exposed to the UV light must be able to withstand the UV irradiation. In addition, the material must also be able to withstand the line pressure of the potable water source. Furthermore, the conduit material will preferably be inert or non reactive with strong oxidizers, such as ozone.

One embodiment uses a conduit made of a material that is transparent to ultraviolet radiation, such as a perfluoro (ethylene-propylene) copolymer (FEP). FEP tubing provides a non-stick surface, which reduces the likelihood of contaminants in the stream adhering to the inner surface of the tube and blocking the path of the ultraviolet light. In addition, a tube made of FEP will not be brittle, and thus will be less susceptible to breakage than glass tubing would be. Other inert clear plastic tubing would also be acceptable for the water treatment system, as would glass, quartz and other such materials. When flexible plastic tubing is used, the tubing may be wrapped around the UV lamp. Alternatively, the conduit may be adjacent to the UV lamp. Another embodiment may use opaque plastic or metal tubing for the water line with sections of transparent tubing spliced between sections of the opaque tubing to expose the water in the transparent sections to the ultraviolet radiation.

The UV source may be of any intensity sufficient to decontaminate the water stream and may be located adjacent to or inside of the conduit. If the UV source is disposed within the conduit, the UV source must generally be sealed against the pressurized potable water stream flowing past the UV source. In the preferred embodiment, the UV source is disposed adjacent to the conduit, not inside the conduit, to facilitate replacement. Even when the UV source is mounted outside the conduit, the UV source should still be sealed against any surrounding moisture such as, for example, the moisture in the air, spilled water, or dripping water.

The UV source may be any of a variety of ultraviolet lamps well known in the art. A mercury-vapor type lamp is acceptable and should produce the majority of its energy at a wavelength of around 254 nanometers, a wavelength known to be effective in killing microorganisms in water. An ultraviolet ballast with a power supply is preferably connected to the lamp to stabilize the current flowing to the lamp.

It is preferable to combine UV radiation water treatment with ozone water treatment. UV treatment kills water borne microorganisms while the water is being directly exposed to UV radiation, but there is no "residual" UV radiation carried in the water to prevent new microorganism growth downstream. Ozone, on the other hand, can be injected and transported throughout the system with a "residual" effect, killing off any microorganisms that survived the UV radiation and ensuring that colonies cannot thrive in the conduits and other areas of the water system not directly exposed to the UV radiation.

UV radiation can kill microorganisms even when the water is flowing quickly past the UV radiation source. Ozone, however, must have a longer period of exposure to contaminants within water to be effective as a disinfectant and ozone alone is not effective during a short exposure time as may occur when a large amount of water is being brought in through the refill valve to the reservoir. The combination of UV radiation with the ozone treatment of the water provides a powerful water treatment disinfectant.

When combining ozone injection with ultraviolet radiation exposure, the best results for disinfection are achieved when the ozone is injected adjacent to the downstream end of the ultraviolet radiation. Preferably, ozone should be injected into the water conduit within one conduit diameter upstream or downstream of the downstream end of an ultraviolet radiation treatment zone. The conduit diameter is the diameter of the conduit through which the water to be disinfected is being transferred. Additionally, ozone should be injected adjacent the discharge of a circulating pump and adjacent a potable water makeup valve into the water reservoir. Preferably, though not limiting, the ozone should be injected no more than one conduit diameter downstream of the circulating pump discharge and no more than 1 conduit diameter downstream from the makeup valve.

The ozone generator provides ozone to the water streams and reservoir of the ice machine or beverage dispenser. In one preferred embodiment of the invention, the ozone generator is an electrolyzer, which can produce ozone with sufficient pressure to inject the ozone into the water treatment system. Alternatively, ozone may be produced by the corona discharge method and inducted into the water streams with a venturi or other device known in the art.

The preferred ozone-generating electrolyzer comprises a cathode and an anode that are separated by a proton exchange membrane (PEM). Deionized water is directly or indirectly provided to the anode side of the ozone generator. Deionized water may be produced by treating potable water with resins or other techniques well known in the art. Optionally, the water may also be filtered to prevent if the water supply to the ozone generator from containing solids. A low voltage DC power supply provides a potential difference across the membrane with the positive terminal of the power supply connected to the anode of the electrolyzer and the negative terminal to the cathode of the electrolyzer.

Water is then provided to the anode having an electrocatalyst, such as lead dioxide, in intimate contact with the anode-side surface of the PEM.

A catalytic reaction at the anode allows the water to be disassociated into hydrogen and oxygen atoms, with some of the oxygen forming ozone. The reaction liberates electrons from the hydrogen atoms, thereby leaving protons. The protons pass through the proton exchange membrane to the cathode side of the ozone generator where the protons contact a cathode electrocatalyst in intimate contact with the cathode-side surface of the PEM. The power supply removes the electrons from the anode and returns the electrons to the cathode where the electrons join with the protons to form hydrogen gas. Hydrogen is a waste byproduct of the electrolyzer process. The hydrogen may be vented off to the atmosphere at a safe location or alternatively, it may be sent to a hydrogen burner for disposal as disclosed in U.S. Pat. No. 6,232,010, hereby fully incorporated by reference. Alternatively, the protons and electrons may be consumed in alternative reactions, such as in the production of water by supplying oxygen to the cathode. Other cathode reactions may be carried out as well, as understood in the art, and such reactions are within the scope of the present invention.

Typically, the cathode electrocatalysts are platinum black or platinum. The anode electrocatalyst is preferably lead dioxide. In non-continuous ozone generation applications, the anode electrocatalyst may degrade if left in contact with the PEM with no current flowing through the cell. Therefore, a means to remove the electrocatalyst from being in intimate contact with the anode-side of the PEM is provided. The electrocatalyst may be applied to a frit that can be pushed against the PEM when ozone generation is required, and then pulled back from the PEM surface when ozone generation is halted. The frit may be moved by means selected from electrical, mechanical or a combination thereof. For example, an electric motor may be used to drive the movement of the frit or alternatively, a bellows arrangement, a bourdon tube, or hydraulic means may be used. Any means that presses the frit against the PEM during ozone generation and pulls the frit back from the PEM when the ozone generation is halted is acceptable. One preferred apparatus having a retractable electrode is disclosed in U.S. patent application Ser. No. 10/016,482 filed on Dec. 10, 2001, which application is incorporated by reference herein.

In a preferred embodiment, the controller activates the frit movement and ozone generation whenever the controller determines the need to generate or cease generating ozone. The controller may sense different conditions in the ice machine or beverage-dispensing machine and start and stop ozone generation and take other actions based upon these conditions. For example, these conditions may be selected from the running state of the refrigeration compressor, the condenser fan, and the recirculation pump, and the ice level in the storage bin, the "open" condition of the door to the storage bin and combinations thereof.

In one embodiment, a bourdon tube or bellows may be connected to the discharge side of the refrigerant compressor. When the refrigerant compressor kicks on, the increased pressure in the refrigerant line may move the bourdon tube or bellows, thereby moving the frit, and pressing the electrocatalyst on the frit against the PEM to start ozone generation.

Alternatively, another actuation method includes opening a solenoid valve when the pressure increases in the refrigerant line or when satisfying a given condition, such as refrigerant compressor "on" or condenser fan "on", activates another switch. Opening the solenoid valve allows high-pressure water to enter a diaphragm or piston chamber that would exert pressure against the frit, pushing the frit against the PEM to start ozone generation. Likewise, when the given condition is not satisfied, the solenoid valve would close, shutting off the high-pressure water, and the frit would move back, pulling the frit back from the PEM to stop ozone production. A spring may be used to push the frit back or another solenoid valve may open to exert an opposite force on the frit. Optionally, another solenoid valve may open to release the pressure pushing the frit against the PEM or other means known in the art may be used to release the pressure.

Excess heat generated by the electrolyzer ozone generator may be removed by circulating a portion of the chilled water circulating in the ice machine through a cooler in the ozone generator. The water may be circulated through an endplate on the ozone generator or through an electrode chamber or dedicated cooling portion within the cell as known in the art. Especially in ice machines and beverage-dispensing machines that are being retrofitted with an ozone/UV treatment system in accordance with the present invention, a small, dedicated circulating pump to cool the ozone generator may be preferred, circulating water from the water reservoir.

The deionized water supplied to the anode side of the ozone generator may flow through the cell, where the water becomes ozonated, and then flow to the different injection points within the water system of the ice machine or beverage-dispensing machine. Optionally, the water supplied to the electrolytic cell not only supplies the water necessary for the reaction to produce ozone, but may also carry the ozone away to the injection points. Because the water circulating through the process is chilled water, the concentration of ozone in the circulating water and the reservoir water can be quite high. This is true because the solubility of dissolved ozone in water increases with decreasing water temperature.

Alternatively, hydroscopic membranes that allow ozone gas to pass through them may be included on the outlet stream from the anode side of the electrochemical cell. Ozone gas may then be distributed to the injection points rather than ozone contained in the water flowing through the anode side of the electrolyzer. An example of an electrolyzer with hydrophobic membranes used to separate gaseous ozone from ozonated water in the anode is disclosed in U.S. Pat. No. 6,458,257, which is incorporated by reference herein.

Figure 2:
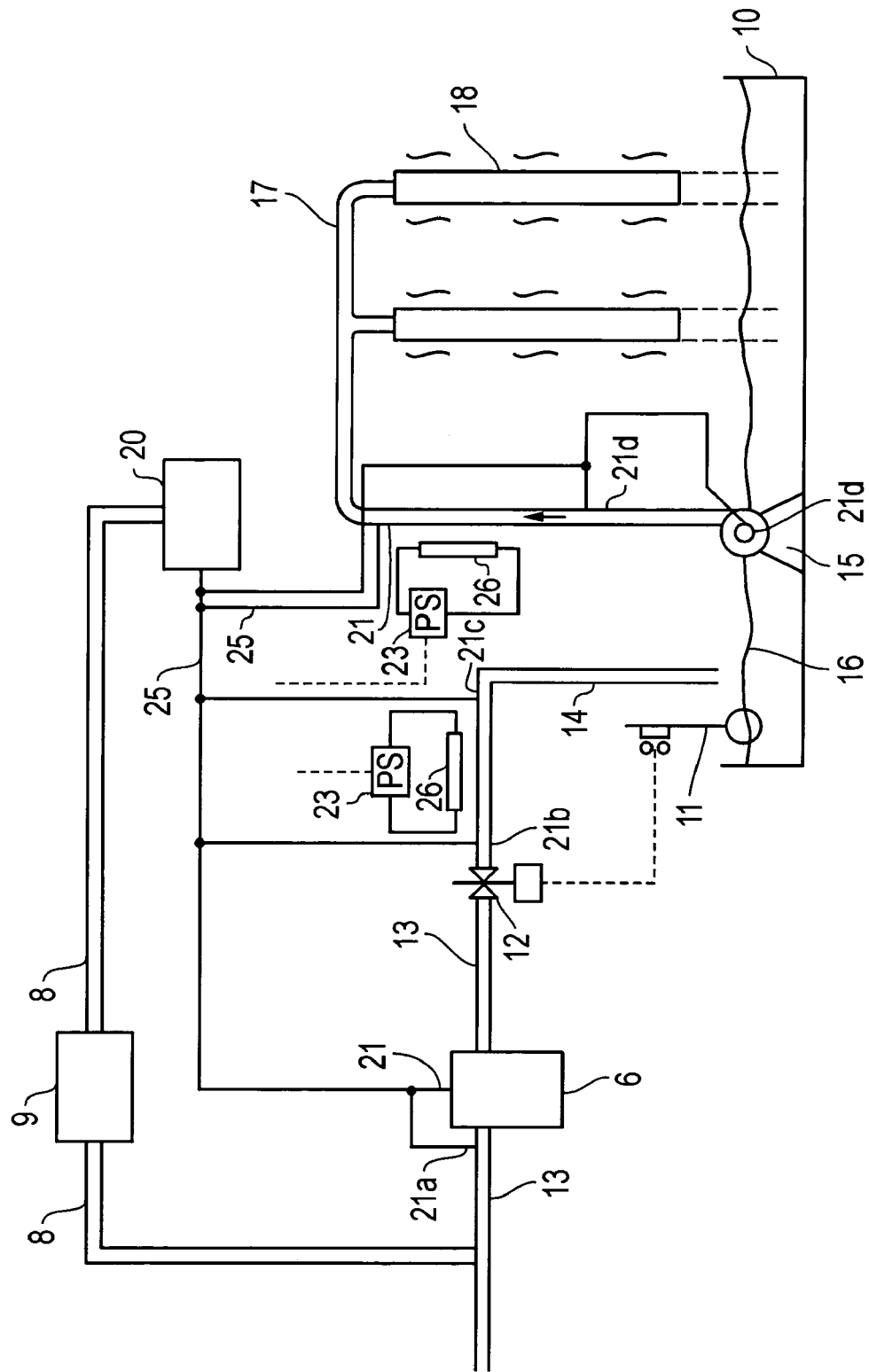
FIG. 2 is a schematic view of an icemaker having ultraviolet and ozone treatment capabilities in accordance with the present invention.

FIG. 2 is a diagram of a modified water recirculation type icemaker having an ultraviolet treatment system and an ozone system in accordance with the present invention. This system includes an ozone generator 20, ozone distribution lines 25, and multiple ozone injection points 21. A slipstream from the potable water supply 13 is fed to a deionizer 9 and then to the ozone generator 20 through a conduit 8. As water enters the system from the potable water supply 13, ozone is injected into the incoming water stream at an ozone injection point, 21a. The water subsequently passes through the refill valve 12, used to maintain the water level in the reservoir 10 and controlled by the level controller 11, and is again injected with ozone through a second ozone injection point 21b to prevent microorganism growth downstream of the refill valve while the refill valve 12 is closed and the water line is stagnant. Optionally, the water may be filtered.

UV treatment is also provided downstream of the refill valve 12. Preferably, ozone and UV treatment will be administered at multiple locations throughout the system to prohibit microorganism growth. Therefore, a UV lamp 26 having a power supply 23 provides the decontamination of the incoming water. However, because suspended particles may block or shield contaminants in the water from the UV radiation, or because the water may have only a short residence time in the conduit providing UV exposure, ozone is injected into the water stream at ozone injection point 21c immediately downstream of the UV lamp in order to continue the decontamination and prevent microbial growth or colonization. The incoming water then flows to the water reservoir 10 containing residual amounts of ozone.

The recirculation pump 15 takes suction from the water reservoir 10. The water reservoir is maintained at a specified level by the level controller 11 that controls the refill valve 12. As the water level 16 in the water reservoir 10 drops due to ice production, the refill valve 12 opens, usually refilling the reservoir by periodically batching in enough water to fill the reservoir rather than continuously trickling water into the reservoir to maintain a water level in a continuous manner.

Because ozone that is dissolved in water decomposes easily and therefore has a limited life span, ozone is injected in several areas to ensure that all the water streams are fully decontaminated. Furthermore, when the refill valve 12 opens to refill the reservoir 10, the temperature of the water in the reservoir 10 increases due to the influx of the warmer makeup water. Ozone is then released from the water because the solubility of the ozone in the water is lower at the higher temperature. Therefore, to maintain an adequate ozone residual concentration, ozone is injected into the water at ozone injection points 21d located at the suction and discharge of the circulation pump 15. The circulating water is further treated with UV radiation on the water feed line 17 to the evaporator plates 18, with an additional ozone injection point 21 directly downstream of the UV radiation. After ice is formed, the water circulation is suspended while the ice is sloughed off of the evaporator plates 18, and then water circulation is started again for another ice-making cycle.

Figure 3:
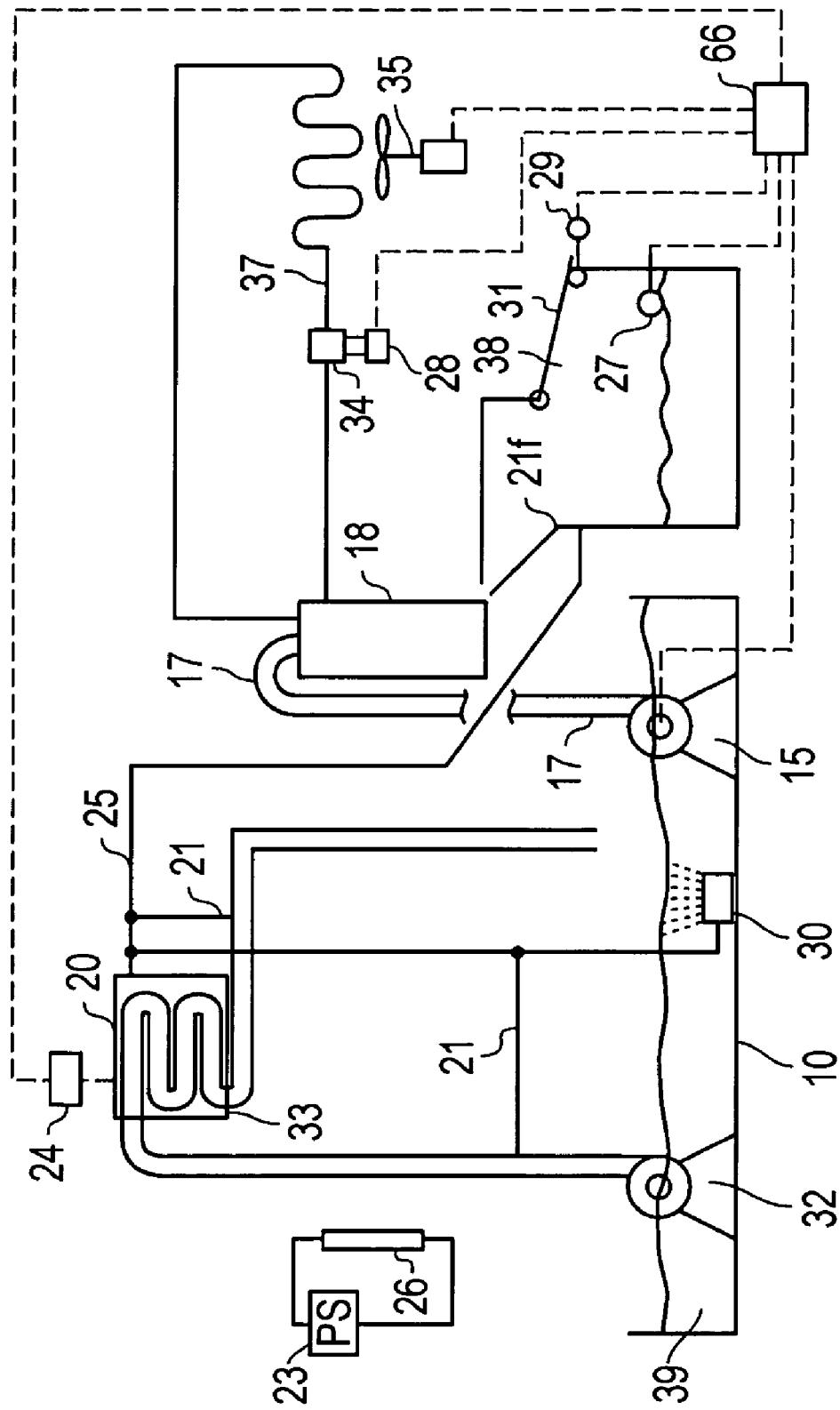
FIG. 3 is a schematic view of a control system for an ice machine in accordance with the present invention.

FIG. 3 is a diagram of a control system for a modified recirculation type icemaker having an ultraviolet treatment system and an ozone treatment system in accordance with the present invention. This embodiment includes a control system for managing the generation and distribution of ozone, including distribution within the ice storage space to disinfect the interior spaces of the icemaker. In addition to being in communication with the ozone system power supply/controller 24, the controller 66 output communicates with one or more of the following: the recirculation pump 15, refrigeration compressor 34, ice level indicator 27, ice bin door switch 29, and condenser fan 35. Optionally, the controller may also electrically communicate with the power supplies 23 of the UV radiation sources 26, turning the UV radiation sources on and off. The controller outputs may be mechanical, electrical, or a combination thereof. Furthermore, the controller may be analog, digital, or some combination thereof, and the controller may comprise one or more controllers located throughout or external to the system.

The controller 66 ensures that the ozone generator 20 does not produce ozone longer than necessary. While the ozone generator may be set up to produce ozone continuously, the controller 66 will preferably be set up to allow ozone production only when water is being circulated to the evaporator plates 18 or when the refrigerant compressor 34 is running. The controller 66 may determine that the refrigerant compressor is running by monitoring the pressure in the refrigerant line 37, the status of the motor of the refrigerant condenser fan 35, or status of the compressor motor 28. The controller 66 may similarly determine that the recirculation pump 15 is running by whether the motor on the recirculation pump 15 is energized or by the pressure in the water circulation line 17.

The ozone generator 20 supplies ozone via the ozone transfer lines 25 to several points within the system. Ozone is distributed directly downstream of the cooling pump 32 discharge and once again directly downstream of the cooling heat exchanger 33. Also, in order to keep the reservoir 10 decontaminated, ozone may be injected into the reservoir water 39 via an ozone diffuser 30. The ozone diffuser 30 causes the ozone to form small bubbles and dissolve into the reservoir water 39. Ozone is also delivered to the interior of the ice bin 38, through an injection point 21f into the ice bin, thereby disinfecting the interior surfaces of the ice bin 38. Optionally, the controller 66 may interact with an ice bin door latching mechanism 29, thereby precluding the ice bin door 31 from being opened during the ozonation of the interior of the ice bin.

Figure 4:
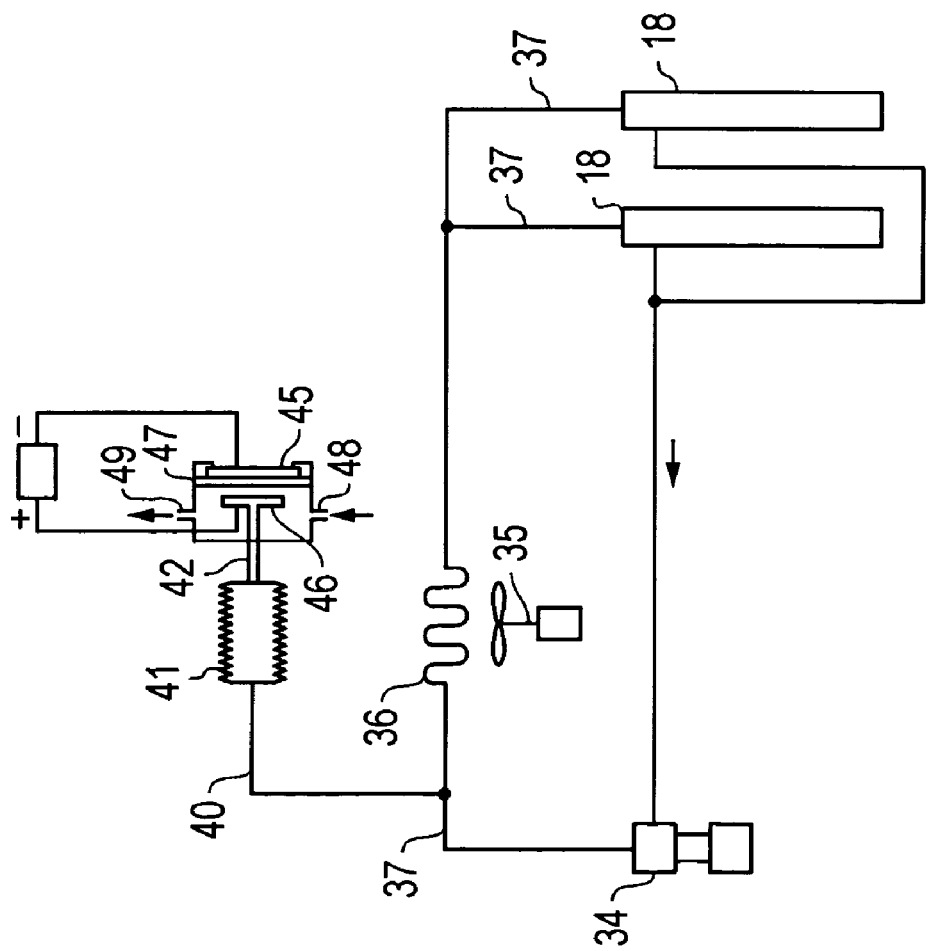
FIG. 4 is a schematic diagram of a control system for the production of ozone in accordance with the present invention.

FIG. 4 is a schematic diagram of a mechanical means to start and stop the production of ozone. The refrigerant compressor 34 pumps refrigerant to the condenser coil 36 and to the evaporator plates 18. When the refrigerant compressor 34 is running, the pressure in the refrigerant line 37 increases, thereby increasing the pressure in a set of bellows 41 which are in fluid communication with the refrigerant line 37 through a pressure line 40. The bellows 41 are fluidly dead-ended, but are also attached to a push rod 42 having the anode electrode 46 attached to the end of the push rod 42. The increase in refrigeration discharge pressure causes the pressure to increase in the bellows 41, thereby pushing the anode electrode 46 against the proton exchange membrane 47. When the anode electrode 46 engages the proton exchange membrane 47, ozone production begins. Likewise, when the compressor 34 turns off, the pressure in the bellows 41 will decrease, pulling the anode electrode 46 away from the PEM, thereby causing the ozone production to stop. Deionized water is supplied to the ozone generator through an inlet nozzle 48 and ozonated water flows from the ozone generator through an outlet nozzle 49. Alternatively, hydrophobic membranes may be positioned in communication with the anode chamber to allow the separation of the ozone from the ozonated water, thereby producing gaseous ozone that may be injected into the ozone injection points 21.

Figure 5:
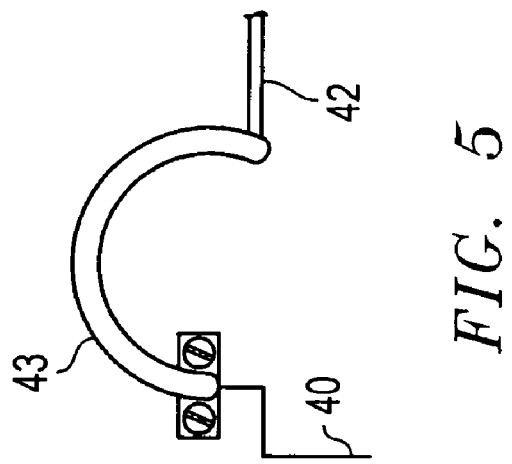
FIG. 5 is a schematic diagram of an alternative control element in accordance with the present invention.

FIG. 5 is a diagram of an alternative control element. The bourdon tube 43 operates like the bellows 41 disclosed in FIG. 4. When the refrigeration compressor 34 is turned on, the pressure increase causes the bourdon tube 43 to expand or to straighten. This movement in the bourdon tube 43 forces the push rod 42 toward the proton exchange membrane 47, just as the bellows 41 of FIG. 4, initiating the start of the production of ozone.

Figure 6:
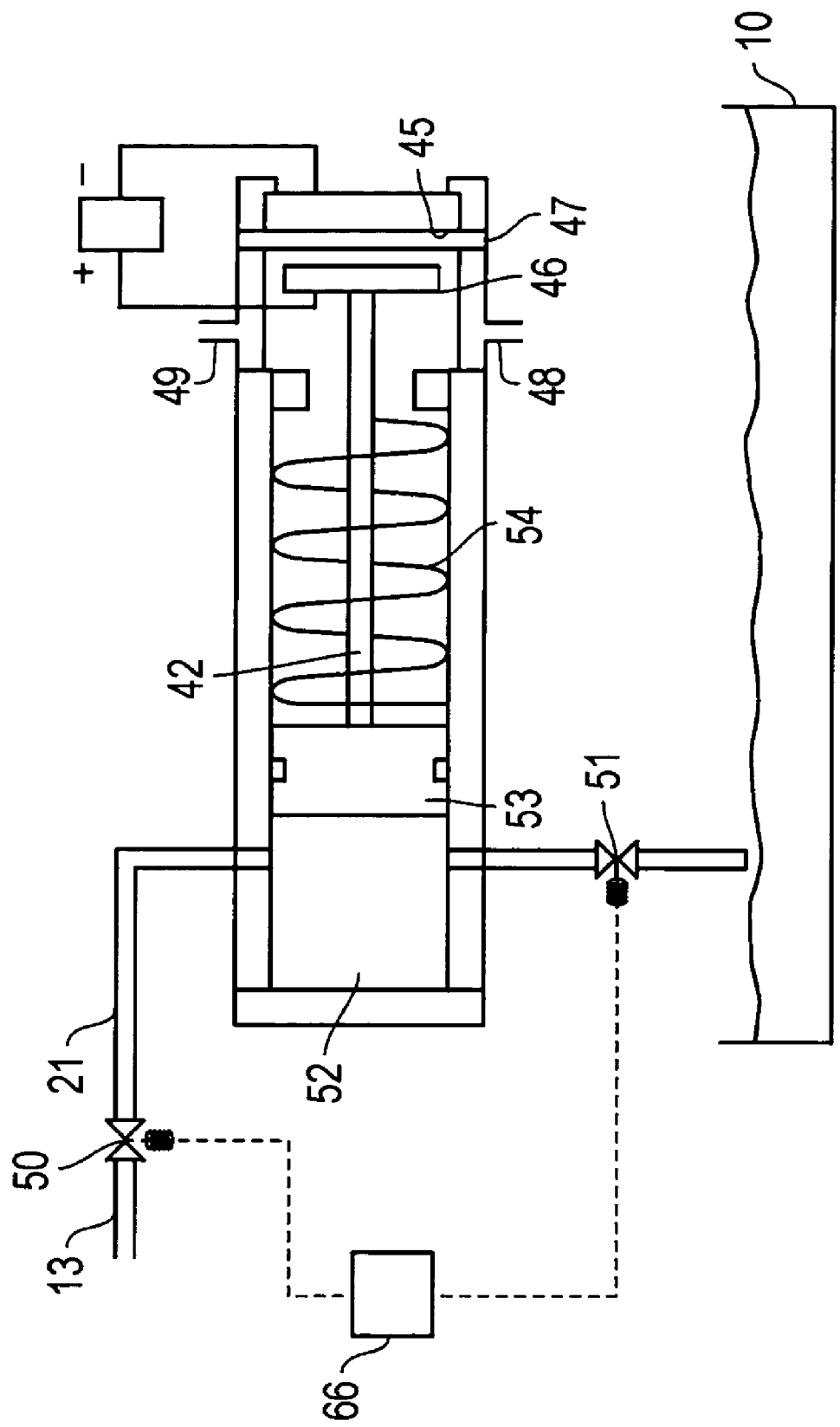
FIG. 6 is a schematic diagram of an alternative control system to start and stop the production of ozone in accordance with the present invention.

FIG. 6 is a schematic diagram of yet another alternative control system to start and stop the production of ozone. While this alternative uses hydraulics to move the anode electrode 46 against the PEM 47, and the alternatives shown in FIGS. 4 and 5 used bellows or bourdon tubes to move the anode electrode 46, these are exemplary alternatives and are not meant to be limiting. Other means, such as an electric motor, may also be used to move the anode electrode against the PEM. This control scheme utilizes the water pressure of the potable water supply 13. The controller 66 may activate ozone production at a predetermined time, such as when the refrigerant compressor is turned on or other event. At the predetermined time, the controller 66 opens a pressurize solenoid valve 50 and closes a depressurize solenoid valve 51, allowing water into the piston chamber 52, thereby increasing the pressure in the piston chamber 52. The increases pressure drives the piston 53 towards the proton exchange membrane 47. The anode electrode 46 is mounted on the end of the pushrod 42 connected to the piston 53, so that the anode electrode is pushed into contact with the PEM 47, and thereby starting ozone production. To stop ozone production, the controller 66 closes the pressurize solenoid valve 50 and opens the depressurize solenoid valve 51, thereby releasing the pressure in the piston chamber 52 by releasing the water into the reservoir 10. A spring 54 pushes the piston and anode electrode away from the PEM 47, thereby stopping ozone production.

While the foregoing is directed to the preferred embodiment of the present invention, other and further embodiments of the invention may be devised without departing form the basic scope thereof, and the scope thereof is determined by the claims which follow.

What is claimed is:

1. An ice machine, comprising:
   a makeup water conduit comprising one or more ultraviolet transmission surfaces and one or more ozone injection ports;
   a circulating water conduit comprising one or more ultraviolet transmission surfaces and one or more ozone injection ports, wherein water is circulated by a circulating pump from a water reservoir to evaporator plates;
   one or more ultraviolet radiation sources, wherein the one or more ultraviolet radiation sources are adjacent to the ultraviolet transmission surfaces;
   an ozone generator in fluid communication with the one or more ozone injection ports, wherein the ozone generator comprises an electrolyzer; and
   one or more controllers, wherein the controllers start and stop the one or more ultraviolet radiation sources, the ozone generator, or combinations thereof.

2. The ice machine of claim 1, wherein the ozone injection ports are at locations upstream of each of the one or more ultraviolet radiation sources, downstream of each of the ultraviolet radiation sources, or combinations thereof.

3. The ice machine of claim 2, wherein the ozone injection ports are located less than one conduit diameter downstream of the one or more ultraviolet radiation sources.

4. The ice machine of claim 2, wherein the ozone injection ports are located less than three conduit diameters downstream of the one or more ultraviolet radiation sources.

5. The ice machine of claim 1, wherein the ultraviolet radiation source is an ultraviolet lamp, and wherein a majority of the ultraviolet radiation produced by the ultraviolet lamp is about 254 nanometers.

6. The ice machine of claim 1, further comprising:
   a refill valve, wherein the refill valve is located in the makeup water conduit, and wherein the refill valve opens to refill the water reservoir whenever a water level in the water reservoir reaches a low level setpoint.

7. The ice machine of claim 6, wherein one of the one or mare ozone injection points is located no more than three conduit diameters downstream of the refill valve.

8. The ice machine of claim 6, wherein one of the one or more ozone injection points is located no more than one conduit diameter downstream of the refill valve.

9. The ice machine of claim 1, wherein one of the one or more ozone injection points is located no more than three conduit diameters downstream of the circulating pump discharge.

10. The ice machine of claim 1, wherein one of the one or more ozone injection points is located no more than one conduit diameters downstream of the circulating pump discharge.

11. The apparatus of claim 1, wherein the ozone leaves the ozone generator in a form of gaseous ozone, ozonated water, or combinations thereof.

12. The apparatus of claim 11, wherein the ozone generator produces gaseous ozone, the ozone generator further comprises:
   at least one hydroscopic membrane, wherein the gaseous ozone may pass through the membrane and water cannot pass through the membrane.

13. The apparatus of claim 1, wherein the electrolyzer comprises:
   a cathode electrode;
   an anode electrode;
   an electrolyte disposed between the cathode and the anode, wherein the electrolyte is a proton exchange membrane; and
   means for retracting the anode electrode away from the proton exchange membrane to stop ozone production.

14. The apparatus of claim 13, wherein the means for retracting are a bourdon tube, a set of bellows, or a hydraulic piston.

15. The apparatus of claim 14, wherein a motive fluid to move the means for retracting is a refrigerant from a refrigerant compressor discharge line or pressurized water from the circulating pump discharge or a potable water supply.

16. The apparatus of claim 13, wherein the means for retracting is an electric motor.

17. The apparatus of claim 1, wherein the ozone generator is in fluid communication with each of the ozone injection ports.

18. The apparatus of claim 1, wherein one of the one or more controllers for starting and stopping ozone generation communicate electrical signals, mechanical signals, or combinations thereof with devices selected from a refrigeration compressor, a condenser fan, or the circulating pump.

19. A method for decontaminating water in an ice making machine, comprising:
   exposing water in a region of a makeup water conduit to ultraviolet radiation and exposing water in a region of a circulating water conduit to ultraviolet radiation through one or more ultraviolet transmission surfaces;
   producing ozone with an ozone generator, wherein the ozone generator is an electrolyzer;
   injecting ozone into the water adjacent the downstream ends of the ultraviolet radiation exposing region; and
   controlling ozone production wit a controller, wherein an ozone generator is not continuously producing ozone.

20. The method of claim 19, further comprising:
   injecting ozone into the water reservoir.

21. The method of claim 19, wherein the ozone injection ports are less than 10 conduit diameters downstream of the ultraviolet transmission surfaces.

22. The method of claim 19, wherein the ozone injection ports are no more than 1 conduit diameter downstream of the ultraviolet transmission surfaces.

23. The method of claim 19, wherein the ultraviolet radiation is generated by an ultraviolet lamp.

24. The method of claim 19, wherein the makeup water conduit further comprises a makeup valve, and wherein an ozone injection port is located downstream of the makeup valve, the method further comprises:

injecting ozone into the ozone injection port downstream of the makeup valve.

25. The method of claim 24, wherein the ozone injection port downstream of the makeup valve is less than 10 conduit diameters downstream of the makeup water valve.

26. The method of claim 24, wherein the ozone injection port downstream of the makeup valve is less than 1 conduit diameter downstream of the makeup water valve.

27. The method of claim 19, wherein the ozone leaving the electrolyzer is in a form selected from gaseous ozone and ozonated water.

28. The method of claim 19, further comprising:
separating gaseous ozone from the ozonated water in an anode of the electrolyzer.

29. The method of claim 28, wherein the step of separating gaseous ozone is accomplished wit at least one hydrophobic membrane.

30. The method of claim 19, wherein step of controlling ozone production with a controller further comprises:
pulling an anode electrode from a proton exchange membrane to stop ozone production;
pushing the anode electrode against the proton exchange membrane to start ozone production.

31. The method of claim 30, wherein the step of controlling ozone production further comprises:
receiving a communication signal from the controller to push an anode electrode against a proton exchange membrane, wherein the communication from the controller is an electrical signal, a mechanical signal or combinations thereof.

32. The method of claim 30, wherein the controller is an electrical device, a mechanical device, or combinations thereof.

33. The method of claim 30, wherein the controller is a bourdon tube, a set of bellows, or a hydraulic piston.

34. The method of claim 30, wherein the motive fluid to move the controller is a refrigerant from a compressor discharge line or pressurized water from the circulating pump discharge or a potable water supply.

35. The method of claim 19, wherein the ozone generator is in fluid communication with each of the one or more ozone injection parts.

* * * * *